United States Patent Office 2,830,009
Patented Apr. 8, 1958

2,830,009

CHROMATOGRAPHIC RECOVERY OF VITAMIN $B_{12}$

William M. Ziegler, Clementon, N. J., assignor to American Cyanamid Company, New York, N. Y., a corporation of Maine No Drawing. Application March 1, 1955
Serial No. 491,535

12 Claims. (Cl. 167—81)

This invention relates to improved chromatographic recovery and purification of vitamin $B_{12}$. More particularly, the invention relates to adsorption of a vitamin $B_{12}$ complex on an active alumina column from a solvent which may be either anhydrous or may contain up to 25% of water, the column being adjusted to a critical pH range whereby the adsorbate in the column may be developed in a wide band using a mixed aqueous organic solvent as elutrient to recover substantially all of the vitamin in a relatively purified state.

The term vitamin $B_{12}$ as used herein refers to a growth promoting factor found to be naturally available in fermentation broths resulting from the culture of various microorganisms. Vitamin $B_{12}$ is known to be a cyano-cobalt-amine (cyanocobalamin) complex in which the cobalt is bonded to organic amino substance through coordinate valencies of the Werner type. See Science 112 (1950), pages 354-355.

As usual for coordinate valent complexes, the cyano group may be displaced from the coordination sphere by processes involving other anions having strong coordination tendencies. Thus, for example, there is a hydroxo-coordination cobalt-amine complex (hydroxy cobalamin) wherein the original $B_{12}$ cyano group has been replaced by hydroxo. Other various modifications of vitamin $B_{12}$ (cyano) are known, such as chloro-cobalt-amine, sulfato-cobalt-amine, and cyanato-cobalt-amine. Such modifications may be prepared by treatment of vitamin $B_{12}$ with processes involving the desired anion for displacement of the cyano group therein, for example, by treatment of vitamin $B_{12}$ with processes involving the water soluble chloride, sulfite, sulfate, sulfide, cyanate, etc. Moreover, certain natural vitamin $B_{12}$ culture broths contain some of the modified vitamin $B_{12}$ forms of lower activity. Each of such modifications of vitamin $B_{12}$ exhibit growth promoting activity varying from 30 to 100% of ordinary vitamin $B_{12}$, cyano-cobalt-amine, and the present method is available for chromatographing of vitamin $B_{12}$ modifications of any of these types from solutions thereof of adjusted concentration, and accordingly the term vitamin $B_{12}$ as used hereinafter is intended to be generic thereto.

Most commonly, vitamin $B_{12}$ is made available commercially from various fermentation broths; for example, it is found in the fermentation broth formed by the culture of *Streptomyces griseus* (Rickes et al., Science 108, pages 634-635, December 3, 1948), *Streptomyces aureofaciens* (Pierce et al., J. A. C. S., vol. 71, page 2952) various flavo bacteria, U. S. Patent 2,515,135, and various other microorganism cultures in media having a minute natural or added cobalt content.

The adsorption hereof is effected from natural broth organic solvent extracts containing the vitamin in the relatively concentrated form in which it may have been extracted or further concentrated; or from a solid vitamin $B_{12}$ in a crude or semipurified form from which the original aqueous or organic solvent may have been removed and which is taken up in the solvent hereof in desired concentration for the present chromatographic treatment.

Active (or activated) alumina is a very effective binding agent to adsorb vitamin $B_{12}$, and its modifications as mentioned above, such as hydroxo-cobalt-amine, from many solvents widely variable in structure. The binding or adsorptive strength of such adsorbent is substantially greater as the solvent is anhydrous. Moreover, as practiced in the art, a portion of the vitamin $B_{12}$ may be recovered therefrom by elutriation with anhydrous solvents such as absolute methanol.

According to the method hereof, it is found that advantage may be taken of its strong adsorptive effect to utilize active alumina carefully adjusted in pH in the specific alkaline range of 7 to 9, preferably 7.5 to 8.5 to adsorb all of the vitamin activity from a concentrate homogeneously dissolved in a similarly large group of solvents which either are anhydrous or contain up to 25% of water.

Such column is further conditioned to a dry state with any water miscible dry solvent such as methanol, ethanol, isopropanol, or acetone both before and after adsorption, and may then be developed or elutriated, while the alkaline column is in the carefully controlled pH range, with a solvent containing homogeneously dissolved therein from 20 to 60% of water to move the adsorbate as a distinctly colored band separable into relatively distinct fractions.

These fractions contain not only all of the vitamin $B_{12}$, but also the vitamin $B_{12}$ modifications, such as hydroxo-cobalt-amine, which heretofore were immovably retained in the column. Some soluble impurity is also moved through the column by the aqueous organic elutrient, however, much remains, resulting in the advantages of greatly increased yield in that practically all the vitamin activity is elutriated from the column with more selective fractionation of the vitamin $B_{12}$ and its modifications in substantially purer form. Thus, the present method improves both the yield and the purity. Moreover the present method allows recovery of concentrated select fractions of the vitamin modifications which are convertible by known methods, such as treatment with soluble cyanide, to enhance the overall yield of true vitamin $B_{12}$ from the portion that was heretofore lost in vitamin $B_{12}$ chromatography by remaining immovable in the column by dry solvent development.

While considerable variation of concentration of the vitamin activity in such solvent prior to adsorption is possible, the solution prior to adsorption is preferably adjusted to a vitamin content of from 2 to 40 micrograms of vitamin $B_{12}$ activity per milliliter of solvent.

The solvent from which the crude concentrate is initially adsorbed by the chromatographic column, according to the method hereof, is a neutral organic solvent having from 0 or negligible amounts, say, less than about 1%, up to 25% of water. Thus the alcoholic solvent hereof is not necessarily dry or dried but may be. Such solvent may contain some homogeneously dissolved water, say, as low as about 0.5%, up to 25%, but the solvent is characterized by its ability to take up into solution any water encountered in the system. The solvent is any neutral organic liquid inert to the vitamin and in which the vitamin is soluble, directly or in aqueous organic solvent blends.

While other neutral solvents may be used, I prefer the alcohols and ketones which are miscible or partially miscible with water such as the lower aliphatic alcohols and ketones or higher aliphatic alcohols and ketones generally having less than 10 carbon atoms in the molecule. A substantial aqueous content of up to 25% may be present to enhance the vitamin solubility therein, but where the vitamin is soluble in the dry solvent the presence of up to 25% of water is optional and the solvent may be used dry.

Suitable solvents, accordingly, are mono- or polyhydroxy aliphatic alcohols such as methyl, ethyl, propyl, butyl, or amyl alcohols, and ethylene glycol; aromatic alcohols such as phenol, cresol, guaiacol; cycloaliphatic alcohols such as cyclohexanol; mixed aliphatic-aromatic alcohols such as benzyl alcohol, and cinnamyl alcohol; and mixed alcoholic derivatives which may contain an inert oxygen group such as an ether or a keto group elsewhere in the molecule such as methyl, Cellosolve, phenyl cellosolve or diacetone alcohol. The ketones useful herein are the water miscible or partially miscible aliphatic ketones such as acetone, methyl-ethyl ketone or diethyl ketone; cycloaliphatic ketones such as cyclohexanone; and mixed aromatic or cycloaliphatic-alkyl ketones such as acetophenone or methyl cyclohexyl ketone. Many other mixed keto and alcohol derivatives of these types may be used such as parahydroxy acetophenone.

An essential feature of the present invention resides in the control of the chromatographic column composed of deposited activated alumina from an aqueous slurry controlled to a critical alkaline pH range. The column hereof is relatively ineffective to adsorb vitamin $B_{12}$ and allow fractional separation by elution with aqueous organic solvent at a pH above 9. At a pH between 8.5 and 9, and any acid pH, the column is relatively inefficient but some fractional separation is possible. Accordingly, the column hereof is most desirably controlled in an alkaline range 7.5 to 8.5, but highest efficiency is obtained where the column is accurately controlled in pH in the range of 7.5 to 8 and accordingly this is preferred.

In preparing the column the activated alumina may be suspended in an aqueous liquid such as water or aqueous alcoholic solutions as a slurry. The suspending liquid is adjusted in pH to the desired pH range of the column formed therefrom. It is preferred to first form the column, depositing the slurry of activated alumina as a wet packed column from water or any aqueous solvent in any pH range and adjust the pH thereafter by passing a solution through the column of the desired pH range until the washings thereof indicate the column to be critically adjusted to the pH in the range desired.

The column adjusted to the desired pH range is next treated to remove free water and for this purpose the column is washed until extraneous water has been removed, most conveniently with dry methanol but any other dry solvent such as the dry water miscible alcohols and ketones may be used which do not affect the pH range set. For example any of the anhydrous alcohols mentioned above typically made anhydrous for the purpose of drying the alumina column may be used therefor, and moreover, the solvent used for drying the column, i. e. dry methanol, ethanol, propanol, isopropanol, or acetone is not necessarily the solvent used for supplying the concentrated vitamin to the column for adsorption thereof.

The water-free column moistened with dry solvent is now ready for adsorption of vitamin $B_{12}$. The concentrated solution adjusted to 2 to 40 micrograms/ml. of vitamin $B_{12}$ activity and dissolved in one of the above mentioned alcohols or ketones dry, or containing up to 25% of water is filtered through the column, the vitamin activity becoming completely adsorbed therein. Where the solvent contains free (mechanically held) water, it may be first shaken with some anhydrous salt such as sodium sulfate to remove any free water before passing through the column.

The column, now wet with the solvent used to carry the vitamin for adsorption is again washed with dry methanol or other dry solvent, preferably the same organic solvent to be used with water in the next step for eluting the column but not necessarily so. In the development or elution step a solvent is used having a substantial quantity of water, i. e. from about 20 to about 60% homogeneously dissolved therein. Accordingly, wherever the adsorption solvent is such as would not tolerate the larger quantity of water present in the elution solvent, it is desirably replaced in the dry solvent washing of column with dry water miscible solvent.

The dry solvent washed column having the adsorbed vitamin $B_{12}$ is now developed with an aqueous solvent to elute the adsorbed vitamin $B_{12}$ in separate fractions. The solvent used for elution of the column may be any water miscible solvent of relatively low molecular weight and high volatility such as the lower aliphatic alcohols and ketones having less than six carbon atoms in the molecule. The solvent used for elution is adjusted in water content to contain 60 to 20% of water. Thus, the most useful eluting solvents are methanol, ethanol, propanol, isopropanol and acetone containing 20 to 60% of water, preferably from about 25 to about 50%.

Upon addition of the eluting or developing solvent the adsorbed vitamin differentially dissolves therein and passes down the column in a well defined pink to orange colored band, and may be separated into fractions each of which vary in vitamin activity and purity thereof.

Each of the aqueous organic solvent fractions of eluate may be individually run to dryness and individually purified and each thereafter may be redissolved in a similar solvent as described above and rechromatographed. Each of the fractions after the first chromatographic fractionation and purification is in relatively purified state and the separation as to substance is substantially as complete as the present method affords. Accordingly, a second rechromatography upon one of the fractions serves substantially merely to purify the same further from inactive material and for this step the procedure above may be repeated with any of the solvents mentioned above, or if desired, the rechromatography may be by procedures known in the art; for example, any one of the relatively pure fractions after running to dryness may be taken up in a substantially dry solvent such as absolute methanol and the column may be eluted or developed with dry or 95% methanol.

One of the advantages afforded by the present method is that a fraction containing a substantial quantity of a modification of the vitamin, such hydroxycobalamin may be converted entirely or partially, as desired, to vitamin $B_{12}$, the cyano complex, identical with natural vitamin $B_{12}$. For this purpose the fraction containing the modified vitamin preferably as obtained in aqueous organic solution directly as eluted from the column, is treated with soluble cyanide either hydrocyanic acid or a soluble cyanide salt. For complete conversion, a more than stoichiometric proportion of cyanide would be added, and for partial conversion, less than an equivalent of cyanide would be used. It is more convenient for complete conversion to use an excess of volatile hydrocyanic acid since such excess is volatile and would be removed with the solvent to recover dry natural vitamin $B_{12}$ free of excess cyanide when the cyanide treated solution is run to dryness under diminished pressure at low temperatures.

Thus, as discussed above and as will appear from examples hereinafter, a wide variety of solvents may be fed to a carefully prepared active alumina column in a controlled pH range and have all of the vitamin $B_{12}$ as well as its modifications absorbed therein. Water tolerant solvents dry or containing up to about 25% of dissolved water are satisfactory but the more anhydrous a solution is the greater is the binding capacity of the alumina for vitamin activity dissolved therein. Free water dispersed in the solvent must be avoided for this is also adsorbed by the alumina, and during the washing of the column with dry methanol, may dilute the dry solvent sufficiently at times to move the active principles in the column to interfere in the elution step.

The following examples illustrate the practice of this invention:

Example 1

A *Streptomyces griseus* culture broth is filtered to remove suspended solids, the filtrate and washings are concentrated by solvent extraction in a relatively water immiscible solvent such as benzyl alcohol. The extract solution is run to dryness at low temperature under reduced pressure and the crude dry vitamin $B_{12}$ is taken up in phenylcellosolve in proportion of approximately 14 micrograms of vitamin $B_{12}$ per milliliter of solvent by bioassay. The dry crude vitamin was about 30% pure. A wet-packed one kilogram column of active alumina formed by suspending a slurry of active alumina in water and depositing the same as a column in a tube, is pretreated by passing an aqueous solution containing disodium phosphate therein to adjust the pH to approximately 8.0 obtained by measuring the pH of the liquid after passing through the column. The column is now dried by passing dry, i. e. absolute methanol, through the column until the final washings show little water content. The solution of the crude vitamin in phenylcellosolve is now shaken with a little anhydrous sodium sulfate to remove any suspended water. The vitamin solution is now passed through the active alumina column prepared as described. The filtered solvent passing through is found to contain no vitamin activity, indicating that it is all adsorbed in the column. The column is now washed again with dry methanol to remove residual phenylcellosolve. The column is now developed by passing 75% methanol, i. e. methanol containing 25% of water through the column and separating the eluate as pink to orange colored fractions. The following table illustrates the values of each fraction and the total feed.

| Fraction | Volume, cc. | Vitamin content, mcg. (bioassay) |
|---|---|---|
| Feed | 775 | 10,800 |
| 1 | 375 | 375 |
| 2 | 2,000 | 2,200 |
| 3 | 900 | 5,600 |
| 4 | 500 | 425 |
| 5 | 1,100 | 2,200 |
| Recovered | | 10,800 |

Fractions 3, 4, and 5 were combined and evaporated at 40° C. under diminished pressure to dryness. The dried vitamin was extracted with methanol and rechromatographed on a similarly prepared alumina column and now developed with 95% methanol. After running again to dryness and recrystallizing 10 milligrams of vitamin $B_{12}$ of 75% purity was obtained.

Example 2

A crude dry vitamin $B_{12}$ extract having a purity of approximately 50% was dissolved in 1300 cc. of an acetone solution containing 25% of water to give a total vitamin content by bioassay of 10,300 micrograms of vitamin activity in solution, a concentration of 7.9 micrograms of vitamin $B_{12}$ activity per millimeter of solvent. An active alumina column was prepared as described in Example 1 adjusted by pH of the washings to a columnar pH of 7.5, and then washed to remove water with dry methanol. The aqueous acetone solution of the vitamin was then fed to the column and it was noted that the solution passing from the column contained no vitamin activity indicating the total to be adsorbed.

After adsorption the column was washed and dried by passing therethrough 300 cc. of absolute methanol to remove water and acetone. The column was now eluted with a 50% methanol solution in water and cuts were taken as follows:

| Fraction | Volume, cc. | Vitamin content, mcg. (bioassay) |
|---|---|---|
| Feed | 1,300 | 10,300 |
| 1 | 1,300 | 725 |
| 2 | 400 | 180 |
| 3 | 870 | 8,700 |
| 4 | 500 | 450 |
| Recovered | | 10,055 |

The third eluate fraction was treated by passing hydrogen cyanide gas therein to impart a cyanide excess in solution. The solution of cyanide and vitamin was then evaporated to dryness under reduced pressure at a temperature of 35° C. and the residue was extracted with dry methanol. The methanol extract was rechromatographed on a similar alumina column which had been adjusted to a pH of 7.5 and dried by washing with absolute methanol. The column was developed with absolute methanol as a developing agent. The active fraction was evaporated and crystallized. The red crystals contained 7.5 milligrams by bioassay and were 87% pure. In comparison it will be noted that the pure vitamin $B_{12}$, produced as the hydrate, contains 88 to 89% of vitamin $B_{12}$ indicating that the crystals obtained in this example were substantially ultimately pure. Thus it is to be noted that in the final purification method such as the treatment with hydrogen cyanide, the second chromatographic purification is the normal purification conventionally applied such as shown in U. S. Patent 2,530,416, to Frank K. Walsh. The step of treatment with cyanide converts modified forms of the vitamin mentioned above to the more microbiologically active vitamin $B_{12}$ and thereby substantially improved the apparent yield. This illustrates that the present chromatographic method isolates the modified forms of vitamin $B_{12}$ where the development solvent is aqueous, rendering the purified active material available as a fraction for conversion to natural vitamin $B_{12}$, which would normally be lost in the column using known chromatographic methods.

Example 3

An isopropanol extract of a broth was poured into a dry methanol washed 1 kilogram column of active alumina adjusted to a pH of 7.9. After the extract had been run through, the column was washed with dry methanol and then developed with 50% methanol. The original isopropanol extract had a purity of 50%, and a total volumn of 1000 cc. containing 20,000 micrograms of vitamin $B_{12}$ activity by bioassay, indicating a concentration of 20 micrograms per cc. of solvent. The column was then developed with 50% aqueous methanol and eluate cuts were taken as follows from the column:

| Fraction | Volume, cc. | Vitamin content, mcg. (bioassay) |
|---|---|---|
| Feed | 1,000 | 20,000 |
| 1 | 1,100 | 100 |
| 2 | 950 | 19,000 |
| 3 | 900 | 1,200 |
| Recovered | | 20,300 |

The second fraction was treated with hydrocyanic acid as described in Example 2 and rechromatographed to obtain a yield of 15 milligrams of vitamin $B_{12}$ content by bioassay which were 87% pure upon final crystallization.

Example 4

A concentrated crude *Streptomyces griseus* aqueous broth was first filtered to remove suspended organic matter, diluted with four volumes of isopropanol and then passed through a 1 kilogram column of active alumina prepared as in previous examples by adjustment to a pH of 7.7 and washing with 200 cc. of dry methanol. The column was then developed with a 50% aqueous methanol solution. The solvent solution containing approximately 20% of water had a total volume of 5900 cc. and a vitamin content by bioassay of 14,000 micrograms of vitamin $B_{12}$, the solution having a vitamin $B_{12}$ concentration of 2.4 micrograms of vitamin $B_{12}$ per milliliter. Cuts were taken as follows:

| Fraction | Volume, cc. | Vitamin content, mcg. (bioassay) |
|---|---|---|
| Feed | 5,900 | 14,000 |
| 1 | 6,000 | 900 |
| 2 | 500 | 11,500 |
| 3 | 1,300 | 4,000 |
| Recovered | | 16,400 |

The second fraction was worked up as described in Example 2 with hydrogen cyanide and rechromatographed, and the dry vitamin recrystallized to give a total yield of 10 milligrams of vitamin $B_{12}$ having a purity of 87%.

Example 5

An 80% methanol (containing 20% of water) extract of a solid vitamin $B_{12}$ concentrate obtained by running a broth extract to dryness and taken up in the 80% methanol solution as a solvent was passed through a 1 kilogram column of active alumina prepared as in previous examples by adjustment in pH to 7.9 and washing with 200 cc. of absolute methanol. The crude dry vitamin prior to solution had a purity of about 45%. The solution prior to chromatographing from 80% methanol had a total volume of 570 cc. and a vitamin content of 8,500 micrograms by bioassay indicating a concentration of 14.8 micrograms of activity per cc. The concentrate after passing through the column was developed with a 50% methanol solution, cuts being taken as follows:

| Fraction | Volume, cc. | Vitamin content, mcg. (bioassay) |
|---|---|---|
| Feed | 570 | 8,500 |
| 1 | 850 | 1,400 |
| 2 | 1,500 | 5,700 |
| 3 | 1,000 | 500 |
| Recovered | | 7,600 |

The second fraction after treatment with hydrogen cyanide, running to dryness and rechromatographing from methanol as in Example 2 and developing with absolute methanol gives a yield of 6 milligrams of crystals by bioassay having a purity of 87%.

Example 6

A benzyl alcohol solution of a dry concentrate having a dry concentrate purity of 48% and a total volume of 1320 cc. containing 17,500 micrograms of vitamin $B_{12}$ by bioassay indicating a total concentration of 13.2 micrograms of vitamin activity per milliliter of solution was passed through a 1 kilogram column of active alumina prepared as in previous examples by adjustment to a pH of 8 and washing with 400 cc. of dry methanol. Fractions were taken as follows:

| Fraction | Volume, cc. | Vitamin content, mcg. (bioassay) |
|---|---|---|
| Feed | 1,320 | 17,500 |
| 1 | 1,800 | 1,800 |
| 2 | 250 | 12,000 |
| 3 | 800 | 800 |
| Recovered | | 14,600 |

The second fraction gave 10 milligrams by bioassay of crystalline material having a purity of 87% of vitamin $B_{12}$ after rechromatographing and ultimate purification as described in Example 2.

Example 7

A butanol concentrate obtained by dissolving crude dry vitamin $B_{12}$ having a purity of approximately 45% and total volume 1460 cc. containing 23,400 mcg. of vitamin $B_{12}$ by bioassay indicating a total concentration of 15.9 mcg. of vitamin activity per milliliter was passed through a 1 kilogram active alumina column prepared as in other examples by adjustment to a pH of 7.7 and washing with 200 cc. of absolute methanol. The column was developed with 50% methanol and separated into the following fractions:

| Fraction | Volume, cc. | Vitamin content, mcg. (bioassay) |
|---|---|---|
| Feed | 1,460 | 23,400 |
| 1 | 1,420 | 570 |
| 2 | 200 | 260 |
| 3 | 1,850 | 20,500 |
| 4 | 1,100 | 1,400 |
| Recovered | | 22,730 |

The third fraction on rechromatographing and ultimate purification as described under Example 2 gave a yield of 13.2 milligrams of crystalline vitamin $B_{12}$ by bioassay having a purity of 87%.

Example 8

A diacetone alcohol extract was run through a 1 kilogram alumina column as described in the above examples, the column being adjusted to a pH of 8 and was washed with 300 cc. of absolute methanol before and after passing the diacetone alcohol solution concentrate thereto for adsorption therein. The feed in this case was 840 cc. of diacetone alcohol containing 4,600 micrograms of vitamin $B_{12}$ by bioassay, indicating a concentration of 5.5 micrograms of vitamin $B_{12}$ activity per ml. Cuts were taken as follows:

| Fraction | Volume, cc. | Vitamin content, mcg. (bioassay) |
|---|---|---|
| Feed | 840 | 4,600 |
| 1 | 1,150 | 200 |
| 2 | 570 | 3,400 |
| 3 | 940 | 1,000 |
| Recovered | | 4,600 |

The second fraction purified as in Example 2 gave crystals that assay 3.3 milligrams of vitamin $B_{12}$ having a purity of 87%.

Example 9

This example illustrates the effect of variation of the pH of the alumina column from the desired range to some other; for example, an acid column. For this purpose 200 gram columns of active alumina were prepared, each in the same way. One column was washed with buffer of controlled pH to 7.5 and the second column was washed with a 1% hydrochloric acid solution and then washed with water until the pH was 5.0. The water in both columns was then displaced with absolute methanol. An absolute methanol extract of a vitamin $B_{12}$ concentrate comprising 400 cc. of solution containing 6,000 micrograms of vitamin activity by bioassay was divided into 2 equal cc. portions and each fed to one of the columns. The columns were each treated in sequence for development, first with absolute methanol, then with 80% methanol, and finally with 50% methanol. Fractions were separated in both cases according to the color. The following table sets forth the results obtained:

| Fraction | Column pH 7.5 | | Column pH 5.0 | |
|---|---|---|---|---|
| | Volume, cc. | Vitamin content, mcg. (bioassay) | Volume, cc. | Vitamin content, mcg. (bioassay) |
| Feed | 200 | 3,000 | 200 | 3,000 |
| 1 | 290 | 650 | 200 | 100 |
| 2 | 225 | 650 | 360 | 150 |
| 3 | 315 | 700 | 450 | 200 |
| 4 | 270 | 800 | 135 | 950 |
| 5 | 600 | 740 | 600 | 100 |
| Recovered | | 3,540 | | 1,500 |

It will be noted first that the recovery from the acid column was very low in all instances. It will be further noted that the major proportion of the vitamin beginning with fraction 3 was recoverable between the 80% and 50% methanol developer.

Certain modifications known in the art of chromatography may be applied as will occur to those skilled in the art and is intended that the examples given herein be regarded as illustrative and not limiting except as defined in the claims appended hereto.

I claim:

1. In the chromatographic treatment of vitamin $B_{12}$ concentrates, the steps of dissolving the concentrate in a neutral organic solvent inert to said vitamin $B_{12}$ and having less than ten carbon atoms in the molecule and containing from 0 to 25% of water homogeneously dissolved therein, passing said solution through a substantially water-free column of active alumina adjusted to an alkaline pH above 7 and below 9, washing the column containing adsorbed vitamin activity with a dry water-miscible solvent and then developing the column with an organic water-miscible elutrient from the group consisting of lower aliphatic alcohols and ketones having less than six carbon atoms in the molecule and having from about 20% to 60% water homogeneously dissolved therein.

2. The method as defined in claim 1 wherein the pH range is from about 7.5 to about 8.5.

3. A method as defined in claim 1 wherein the water-miscible elutrient has from about 25% to 50% water homogeneously dissolved therein.

4. A method as defined in claim 3 wherein the solvent comprises acetone.

5. A method as defined in claim 3 wherein the solvent comprises isopropanol.

6. A method as defined in claim 3 wherein the solvent comprises methanol.

7. A method as defined in claim 3 wherein the solvent comprises phenyl cellosolve.

8. A method as defined in claim 3 wherein the solvent comprises benzyl alcohol.

9. A method as defined in claim 3 wherein the elutrient comprises methanol.

10. A method as defined in claim 3 wherein the elutrient comprises acetone.

11. A method as defined in claim 3 wherein the elutrient comprises ethanol.

12. A method as defined in claim 3 wherein the elutrient comprises isopropanol.

References Cited in the file of this patent

UNITED STATES PATENTS

| 2,530,416 | Wolf | Nov. 21, 1950 |
| 2,609,325 | Brink | Sept. 2, 1952 |

FOREIGN PATENTS

| 677,487 | Great Britain | Aug. 13, 1952 |